UNITED STATES PATENT OFFICE.

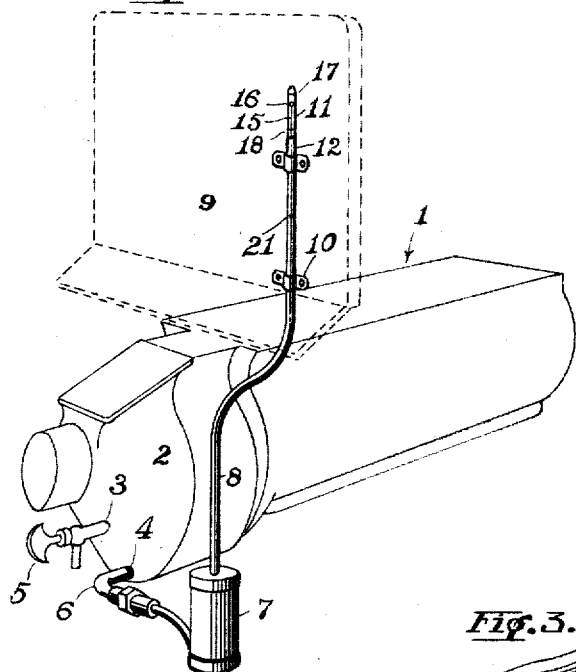
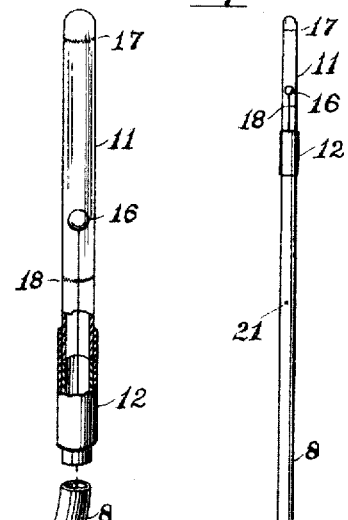
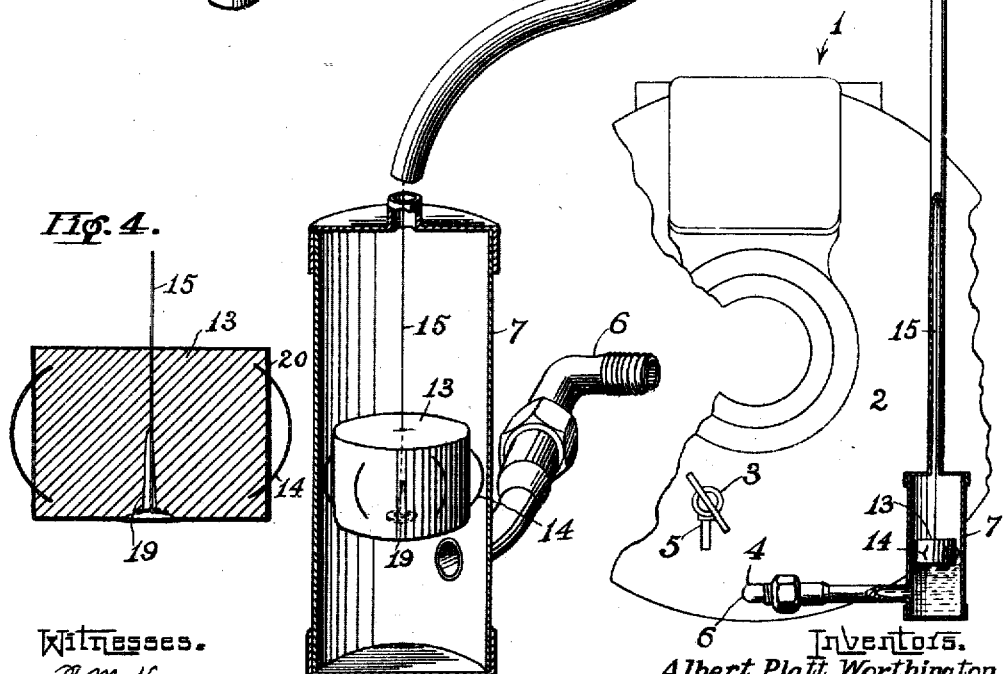
A. P. WORTHINGTON & R. C. AUSTIN.
CRANK CASE OIL GAGE.
APPLICATION FILED FEB. 27, 1914.
1,266,743. Patented May 21, 1918.
Witnesses.
F. M. Keeney
Gustav Drews
Inventors.
Albert Platt Worthington
Raymond C. Austin
by James R. Townsend
their atty

ALBERT P. WORTHINGTON AND RAYMOND C. AUSTIN, OF LOS ANGELES, CALIFORNIA; SAID AUSTIN ASSIGNOR TO SAID WORTHINGTON.

CRANK-CASE OIL-GAGE.

1,266,743.    Specification of Letters Patent.    Patented May 21, 1918.

Application filed February 27, 1914. Serial No. 821,568.

*To all whom it may concern:*

Be it known that we, ALBERT PLATT WORTHINGTON and RAYMOND C. AUSTIN, both citizens of the United States, residing at Los Angeles, in the county of Los Angeles and State of California, have invented a new and useful Crank-Case Oil-Gage, of which the following is a specification.

Our object is to make an oil gage to be marketed as an automobile accessory, the oil gage being adapted for ready connection to a crank case with the indicator on the dashboard.

The accompanying drawings illustrate the invention.

Figure 1 is a perspective view of the oil gage attached to a crank case forming the oil reservoir of an internal combustion engine.

Fig. 2 is an elevation, partly in section, of the liquid gage with a fragment of the crank case.

Fig. 3 is an enlarged elevation of the liquid gage, partly in section, the tube being broken to contract the view.

Fig. 4 is an enlarged sectional elevation of the float.

The engine 1 of an automobile is illustrated with its crank case 2 having rear pet cock openings 3 and 4, in the upper one of which is shown a pet cock 5, the lower pet cock opening 4 being utilized to afford communication between the crank case and the oil gage.

The pipe 6 including a union connects the pet cock opening 4 and the lower portion of the vertical float receptacle 7, which is substantially a closed receptacle of a depth a little greater than the depth of the oil reservoir and practically on a level therewith. The float receptacle will be located at any convenient place, preferably alongside of the crank case as illustrated.

In communication with the upper end of the float receptacle and extending upward therefrom is provided a guide in the form of a long slender tube 8 preferably made of copper and sinuous, bent or bendable so that it may be led to the dashboard 9 where it finally extends upward vertically alongside the dashboard to which it is secured by any suitable means such as clips 10. The upper end of the guide tube 8 is provided with a vertical transparent tubular tip 11 which is out of axial alinement with the receptacle 7 and may be a piece of glass tube, the upper end of which is heated and drawn and then closed. The lower end of the transparent tip 11 is preferably seated inside the upper end of the tube 8 which is spun out large enough at the swell 12 to seat the glass tube 11 that is practically of the same diameter as the main body of the guide tube and is sealed therein by some suitable adhesive substance such as glue, shellac or japan.

A float 13 of cork or the like is adapted to travel on the liquid longitudinally in said receptacle, and is provided with wire loops 14 which serve as antifriction bumpers to hold the float coaxial with the receptacle and to minimize the friction between the float 13 and the wall of the receptacle 7 during the float's longitudinal movements in the receptacle. The wire loops 14 may be secured to the float by merely impressing the ends of the wire loops into the lateral cylindrical wall of the float. By this means, such wall will never ride along the inner wall of the receptacle and only the slight surface of the wire loops 14 will be in engagement with the wall of the receptacle 7. The wire loops 14 may be composed of any thin wire. The float is preferably coated with shellac 20 to exclude liquid from the cork so that its character as a float will not be impaired. The float has secured to it a single long thin wire or flexible stem 15 which is preferably about .006 inch in diameter. The finest banjo string or piano wire will serve. When the very thin banjo E string wire is used for this purpose, it should be heat treated and retempered so that it will not be too stiff to bend readily to pass around the curve and yet will not kink or twist. This may be done on a small scale by stretching the wire very tightly around two nails, for instance, in the atmosphere at a temperature of about 60° F., more or less, and then while in such stretched condition passing a lighted match slowly along its entire length whereby the wire will be air tempered to the proper degree.

The wire 15 may be secured to the float by threading one end of it through the center of the float, then winding that end around a pin such for instance, as tack 19, then driving the tack into the float and then drawing the wire tight. The long wire 15 extends centrally from the top of the float and passes through the long tube 8 and is guided by said tube in a devious path into the transparent tubular portion 11, the wire 15 having a light indication member as the ball or head 16 secured to its upper end. Said ball 16 may be of glass or other suitable material and is adapted to travel longitudinally in the glass tubular portion 11 in which it fits slidably and which is practically equal in length to the depth of the float receptacle 7, and the wire 15 is of such length that when the float 13 is at the bottom of the float receptacle 7, the ball 16 will be visible at the bottom of the transparent tubular portion 11; and when the float 13 is at the top of the float receptacle 7, the ball 16 will be at the top of the glass tubular portion 11. Since the upper end of the glass tubular portion 11 is closed, the interior of the copper tube 8 and glass tube 11 will be protected from dust and foreign material and consequently the wire 15 and glass ball 16 will be guarded against frictional resistance from such source.

Preferably as illustrated, the transparent tubular portion 11 will be provided near its upper and lower ends with liquid level marks as 17, 18 respectively to indicate the safe maximum and minimum liquid levels. These marks may be etched in the glass tubular member, or merely stained by varnish or the like.

The diameter of and the bends in the tube 8 and the thickness of the wire 15 are preferably such as to offer minimum frictional resistance. That is to say, the diameter of the tube 8 will be as small as consistent with the efficiency of the same as a guide for the wire 15 and yet be sufficiently large to prevent any unnecessary friction. The wire above specified will freely pass around a curve having a radius of three inches or more. The bends will be of such gradual inclination as to prevent any undue bending of the wire 15 which might interfere with its movement, and the wire 15 will be of such fineness as to go around the bends but of such strength as is sufficient to withstand the shocks to which it will be subjected in an automobile. It should further be noted that, although the wire is so fine as to offer only a negligible surface contact with the inner wall of the tube 8, it nevertheless has ample strength to support the ball during its movements in the tubular portion 11, and the fit of the ball in the tubular portion is such that the wire cannot kink therein or in any other way prevent a satisfactory operation of the device.

An air vent 21 in the upper portion of tube 8 allows the liquid to flow freely into and out of the float receptacle.

The operation briefly is as follows: The float 13 will rise and fall as the liquid rises and falls in the reservoir 2 and receptacle 7, and the wire 15 will slip around the bends and curves of the tube and will raise and lower the glass ball 16 which will consequently indicate the level of the liquid in the crank case as the ball moves relative to the marks 17, 18. As oil is supplied to the reservoir, when the glass ball 16 has risen to the mark 17 it will indicate that the safe maximum depth of liquid in the crank case has been reached, and consequently the oil supply may then be shut off. On the other hand as the oil is used up the ball 16 will descend and when it reaches the mark 18 it will indicate that the safe minimum supply of liquid in the crank case has been reached and it will thereby serve as a warning to the driver to resupply the crank case.

The accessory thus produced is complete in itself, is simple, efficient and inexpensive, and may be readily applied to any automobile having a crank case for holding oil.

From the foregoing it is seen that whatever the position of the tank or reservoir in which the level of the liquid is to be indicated the float 13 is directly connected to the indicator head 16 by a flexible stem 15 extending through a sinuous tube, so that lost motion between the float and head is avoided and so that liability of sticking and disorganization of the parts is minimized.

Thus there is accomplished for the first time the indication by a rising and falling head of the quantity of liquid in a reservoir out of axial alinement to said rising and falling head.

The principal advantage of the construction embodied in this invention is that what has heretofore been attained by complicated devices having numerous parts is now attained by a very simple device having but few operating parts.

In a gage simplicity of construction and operation is of paramount importance for the more complicated the mechanism the more liable said mechanism is of becoming disarranged so as not to give correct readings; and when a gage is relied upon to indicate the quantity of oil it is essential that the construction be such as to absolutely preclude any danger of the gage giving false readings and thereby avoid the liability of injury to the machinery that is supplied with said oil.

We claim:—

1. The combination with the crank case of an internal combustion engine constituting the oil-feed reservoir from which the oil is splashed or fed to the machinery of the engine; of a receptacle having a little greater height than the maximum liquid height to be maintained in said reservoir; a pipe that connects the lower end of the reservoir to the receptacle; a long slender sinuous tube that communicates with the receptacle and extends upward therefrom; said tube terminating in a glass tubular end portion of substantially the same length as the height of the receptacle; a float that travels longitudinally in the receptacle and is provided with means whereby the friction between the float and the receptacle during the longitudinal movements of the float therein is minimized; a single thin wire connected with the float and passing from the top thereof longitudinally through the upwardly extending tube, a small glass ball slidably fitting in the tubular end portion and being secured at the upper end of said thin wire; the length of the wire being such that when the float is at the bottom of the receptacle, the ball will be at the bottom of the upper glass tube portion, and when the float is at the top of the receptacle the ball will be at the top of the upper glass tube portion, the wire having sufficient strength to support the ball during its movements in the tubular portion and also being of such a thickness as to cause minimization of the friction between the wire and the tube during the wire's longitudinal movements in the tube; and the upper glass tube being provided with marks near its upper and lower ends to indicate the low and high working levels of the liquid.

2. An automobile accessory consisting of a crank case oil gage comprising a float receptacle, a pipe adapted to connect the float receptacle to a crank case, a bendable guide tube extending upwardly from the float receptacle, an indicator glass at the upper end of the bendable guide tube, a float adapted to move longitudinally in the float receptacle, means on the float for minimizing the friction between the float and the receptacle during said longitudinal movement, a single flexible wire connected with the float and extending from the top thereof slidably and longitudinally through the bendable guide tube into the indicator glass, and being of such a thickness as to cause minimization of the friction between the wire and the tube during the wire's longitudinal movements in the tube, and an indicator of a comparatively frictionless material upon the wire within the indicator glass and slidably fitting therein, the wire also having sufficient strength to support the indicator during its movements in the indicator glass.

3. An automobile accessory consisting of a crank case oil gage comprising a float receptacle, a pipe adapted to connect the float receptacle to a crank case, a bendable guide tube extending upwardly from the float receptacle, an indicator glass at the upper end of the bendable guide tube, a float adapted to move longitudinally in the float receptacle, wire loops extending from the periphery of the float, a single flexible wire connected with the float and extending from the top thereof slidably and longitudinally through the bendable guide tube into the indicator glass and being of such a thickness as to cause minimization of the friction between the wire and the tube during the wire's longitudinal movements in the tube, and an indicator of a comparatively frictionless material upon the wire within the indicator glass and slidably fitting therein, the wire also having sufficient strength to support the indicator during its movements in the indicator glass.

4. A liquid level gage comprising a vertical receptacle adapted to be placed on virtually the same level as a liquid reservoir and to be connected at its lower end with the reservoir so as to allow the liquid in the reservoir to enter the receptacle; a float adapted to move vertically in the receptacle with the change of liquid levels therein; means on the float for minimizing the friction between the float and the receptacle during said vertical movement; a sinuous tube extending upwardly from the top of the receptacle; a transparent tubular tip secured to the upper end of the tube; an indicating member made of a comparatively frictionless material and slidably fitting the tubular tip and being adapted to move longitudinally therein; and a single, flexible wire connected at one end with the float and extending from the top thereof longitudinally through the tube into the tubular tip and being at its other end connected with the indicating member so that the indicating member will move simultaneously with the float and thus indicate the liquid level in the receptacle, the wire having sufficient strength to support the indicating member during its movements in the tubular tip and also being of such a small diameter as to cause minimization of the friction between the wire and the tube during the wire's longitudinal movements in the tube.

In testimony whereof, we have hereunto set our hands at Los Angeles, California, this 20th day of February, 1914.

ALBERT P. WORTHINGTON.
RAYMOND C. AUSTIN.

In presence of—
JAMES R. TOWNSEND,
GUSTAV DREWS.